(12) United States Patent
Rami et al.

(10) Patent No.: US 9,062,843 B2
(45) Date of Patent: Jun. 23, 2015

(54) LIGHTING UNIT AND LUMINAIRE FOR ROAD AND/OR STREET LIGHTING

(75) Inventors: Jean-Paul Rami, Vernon (FR); Florian Rocard, Cergy le Haut (FR)

(73) Assignee: THORN EUROPHANE S.A., Les Andelys (FR)

( * ) Notice: Subject to any disclaimer, the term of this patent is extended or adjusted under 35 U.S.C. 154(b) by 947 days.

(21) Appl. No.: 13/203,986

(22) PCT Filed: Mar. 17, 2010

(86) PCT No.: PCT/EP2010/053450
§ 371 (c)(1),
(2), (4) Date: Sep. 29, 2011

(87) PCT Pub. No.: WO2010/106096
PCT Pub. Date: Sep. 23, 2010

(65) Prior Publication Data
US 2012/0057340 A1    Mar. 8, 2012

(30) Foreign Application Priority Data
Mar. 17, 2009 (EP) .................................... 09290190

(51) Int. Cl.
| | |
|---|---|
| *F21V 7/00* | (2006.01) |
| *F21V 5/00* | (2006.01) |
| *F21S 8/08* | (2006.01) |
| *F21V 11/02* | (2006.01) |
| *F21W 131/103* | (2006.01) |
| *F21Y 101/02* | (2006.01) |

(52) U.S. Cl.
CPC ............... *F21S 8/086* (2013.01); *F21V 7/0083* (2013.01); *F21V 11/02* (2013.01); *F21W 2131/103* (2013.01); *F21Y 2101/02* (2013.01); *Y02B 20/72* (2013.01)

(58) Field of Classification Search
CPC ............ F21S 8/086; F21S 8/083; F21V 7/00; F21V 7/0025; F21V 7/0083; F21V 7/0091; F21V 9/00; F21V 11/02; Y02B 20/72; F21W 2131/103; F21Y 2101/02
See application file for complete search history.

(56) References Cited

U.S. PATENT DOCUMENTS

| | | | |
|---|---|---|---|
| 4,367,519 A * | 1/1983 | Houghton et al. ............ | 362/477 |
| 5,949,581 A | 9/1999 | Kurtenbach et al. | |
| 2005/0201102 A1* | 9/2005 | Saccomanno et al. ........ | 362/341 |
| 2009/0103288 A1 | 4/2009 | Boyer et al. | |
| 2009/0109687 A1* | 4/2009 | Householder et al. ........ | 362/309 |

FOREIGN PATENT DOCUMENTS

| | | |
|---|---|---|
| EP | 2 051 001 A2 | 4/2009 |
| WO | WO-2008/125772 A1 | 10/2008 |

\* cited by examiner

*Primary Examiner* — Thomas M Sember
(74) *Attorney, Agent, or Firm* — Marshall, Gerstein & Borun LLP

(57) ABSTRACT

A lighting unit for use in a luminaire, in particular a luminaire for road and/or street lighting, comprising a plurality of light sources and a reflector unit arranged in front of the light sources to control the distribution of the light emitted by said light sources, wherein he reflector unit comprises a plurality of reflector elements arranged parallel to each other, with at least some of the reflector elements comprising a first portion adapted for total reflection and a second portion adapted for partial reflection.

15 Claims, 4 Drawing Sheets

LIGHTING UNIT AND LUMINAIRE FOR ROAD AND/OR STREET LIGHTING

BACKGROUND OF THE INVENTION

1. Field of the Invention

The present invention relates to a lighting unit and a luminaire to be used for street and/or road lighting. In particular, the present invention is directed to a lighting unit having a plurality of light sources and a reflector unit being arranged in front of said light sources to control the distribution of the emitted light.

2. Related Technology

As it is customary with luminaires for street and/or road lighting in urban areas, known street lighting luminaires are mounted on a pole or on a wall front, with the plane of symmetry being directed perpendicular to the longitudinal direction of the street or road to be lit. The luminaire must then throw the generated light sideways from the plane of symmetry so as to evenly light parts of the street or road on the left and right of the luminaire. Further, a portion of the light is also irradiated along the plane of symmetry so as to also illuminate the whole width of the street or road in front of the luminaire.

When developing a luminaire for street lighting, different needs have to be addressed. At first, a fast and efficient installation of the luminaires is desirable. Further, a high utilization factor and efficiency is needed while at the same time the glare rating should be kept as low as possible. As in all lighting applications, a good visibility level should be obtained and the contribution to sky glow should be minimized.

From the prior art, different solutions for road lighting luminaires are known which can generally be divided into two main families.

Conventional road lighting luminaires are usually equipped with one lamp and a corresponding reflector system wherein the reflector system is designed to influence the light in such a way that a desired light distribution is obtained.

Further, road lighting luminaires are known which comprise a plurality of light emitting devices, in particular LEDs. In this case, the LEDs are arranged in a very specific pattern wherein each LED emits its light into a specific direction. In both cases, the known luminaires are regularly spaced on one side or both sides of the road.

The conventional luminaires mentioned above in most cases comprise a high-pressure sodium discharge lamp or a metal halide discharge lamp for which the emitted light of the burner is controlled by a reflector to obtain the desired street lighting. It is known to adapt the light distribution to different desired lighting schemes (i.e., a specific distance between the luminaires or a specific width of the read) by changing the position of the lamp with respect to the reflector. However, the range in which the light distribution can be adapted in this way is limited and also the utilisation factor of such conventional luminaires is limited to a value of 0.45 to 0.5. In order to obtain a significant change in the light distribution characteristic of these luminaires, it would be necessary to change the reflector or use additional optical elements which influence the emitted light.

With respect to the second main family wherein a luminaire is based on a plurality of light emitting devices, different approaches have been proposed. According to a first solution, several light sources with different tilts and orientations are provided to obtain a combined light distribution suitable for road lighting. However, this approach tends to increase the complexity of the system and a limitation of glare is difficult to obtain. In another approach, all the light sources are arranged on the same planar surface and the lighting head of the luminaire is tilted by a relatively high angle (approximately 20° to 30°) in order to obtain an asymmetrical light distribution which is required to illuminate also the opposite side of the road. Finally, there is the possibility to arrange the light sources on the same planar surface which is close to the horizontal (0° to 15°) and to obtain the desired lateral asymmetry of the light distribution by adding micro reflectors or other optical elements to each light source.

However, all solutions known from the prior art suffer from the drawback that it is very complicated and difficult to adapt the light distribution characteristics of the luminaire. A significant change of the light distribution can only be obtained by changing the arrangement of the light sources or using a plurality of different optical elements.

SUMMARY OF THE INVENTION

Accordingly, there is a need for a new solution which allows adapting the light distribution characteristics of a luminaire for street and/or road lighting in a fast and efficient way.

Accordingly, the invention provides a lighting unit for use in a luminaire, in particular a luminaire for road and/or street lighting, the lighting unit having a plurality of light sources and a reflector unit arranged in front of the light sources to control the distribution of the light emitted by said light sources, wherein the reflector unit comprises a plurality of reflector elements being arranged parallel to each other, wherein at least some of the reflector elements comprise a first portion adapted for total reflection and a second portion being adapted for partial reflection.

The present invention is based on the idea of providing a new optical system used to direct the light emitted by a plurality of the light sources in a desired way. In particular, the new optical system includes a reflector unit which is arranged in front of the light sources and comprises several reflector elements which are arranged parallel to each other wherein at least some of said reflector elements comprise a first portion being adapted for total reflection and a second portion being adapted for partial reflection.

Thus, in accordance with the present invention, there is provided a lighting unit for use in a luminaire, in particular in a luminaire for road and/or street lighting, said lighting unit having a plurality of light sources and a reflector unit being arranged in front of the light sources to control the distribution of the light emitted by said light sources wherein the reflector unit comprises a plurality of reflector elements being arranged parallel to each other, and wherein at least some of said reflector elements comprise a first portion being adapted for total reflection and a second portion being adapted for partial reflection.

As will be shown in the following, the specific arrangement and structure of the reflector elements allows controlling the light distribution in a very efficient way. The overall light distribution of the luminaire can thus be easily adapted in order to correspond to the arrangement of the luminaire with respect to the road and with respect to the road dimensions without the need of rearranging the light sources or using additional optical elements. In particular, the present invention allows to influence the light emission in such a way that a lateral asymmetry of the light distribution is obtained where most of the light emitted from the luminaire is directed to the road and additionally smaller portions of the light are used to light the sideways on both sides of the road.

As mentioned above, the specific reflector elements which will be discussed in more detail below comprise a first portion for total reflection and a second portion for partial reflection. In accordance with a preferred embodiment of the present invention, the first portions of the reflector elements are—when seen in the light emitting direction—located nearer to the light sources compared to the second portions of the reflector elements. Further, the second portion of a reflector element can be inclined with respect to the first part. By selecting specific angles between the second portion and a first portion of the reflector elements, the emission of the light can be controlled in a very efficient way. Further, the inventive structure of the reflector elements allows arranging the elements together with the light sources on a plane or at least roughly plan mounting surface. In this way, a very compact lighting unit can be obtained which can be accommodated in a relatively small housing wherein still light is emitted to efficiently light a road or street.

In accordance with a preferred embodiment of the present invention, the light sources are arranged in parallel rows wherein a single row of light sources is located between two adjacent reflector elements. Preferably, LEDs are used as light sources.

It is a specific advantage of the present invention that the inventive lighting unit allows a compact arrangement of the light sources and the reflector unit wherein nevertheless a desired light distribution can be obtained. If the lighting unit of the present invention is used in a luminaire for road and/or street lighting, it is not necessary to use lighting heads with a specific or enlarged housing in order to accommodate the inventive lighting unit. Further, the present invention allows that the lighting head of the luminaire extends horizontally or with respect to the horizontal surface only by a small acute angle in a range between 0° and 15°.

Accordingly, the present invention provides a new solution which allows creating a street lighting with high efficiency wherein changes in the light distribution depending on the actual situation can be easily carried out.

BRIEF DESCRIPTION OF THE DRAWINGS

In the following, the present invention is explained in more detail with respect to the accompanying drawings. In these drawings.

DETAILED DESCRIPTION

Figure 1:
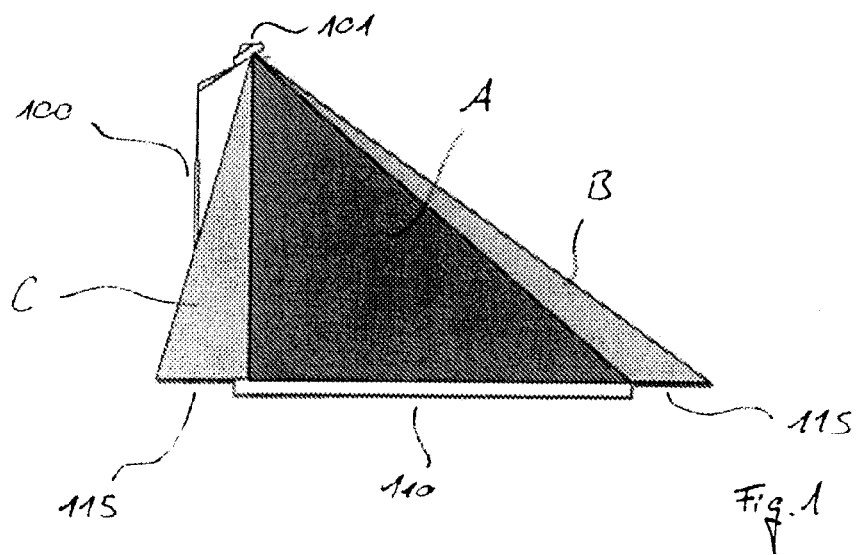
FIG. 1 schematically shows a desired lateral light distribution for a street lighting luminaire.

Before the inventive luminaire is discussed in more detail, the problems of street lighting shall be briefly explained with respect to FIG. 1. This figure shows—in a side view—a situation wherein a street lighting luminaire 100 is located on the side of a road 110 wherein sidewalks 115 are located on both sides of the road 110. The light emitted from the lighting head 101 of the street lighting luminaire 100 should be directed in such a way that most of the light is directed to the road 110 itself. It is thus desirable to obtain at first a first light dihedral A of high intensity which illuminates the road 110. However, the sidewalks 115 on both sides of the road 110 should not be in complete darkness and therefore two additional smaller dihedrals B and C of lower intensity are also desired. Thus, the lighting head 101 of the luminaire 100 has to have a specific light emitting characteristic which results in particular in an asymmetric light distribution in the $C_{90}$-$C_{270}$ plane, i.e., in lateral direction.

It is obvious from FIG. 1 that a specific light distribution of a street lighting luminaire 100 is only suitable for specific lighting schemes. In case the position of the luminaire 100 with respect to the road 110 is changed, the light distribution characteristic has to be adapted accordingly in order to ensure that the road 110 is still illuminated in an appropriate way. The same problem arises if the height of the post 102 of the luminaire 100 is amended or the width of the road 110 or the sideways 115 changes. The present invention now provides a solution which allows to easily and efficiently adapting the light distribution of a street lighting luminaire in order to ensure that in each situation a street is illuminated in an efficient way. This inventive solution will be explained in the following.

Figure 2:
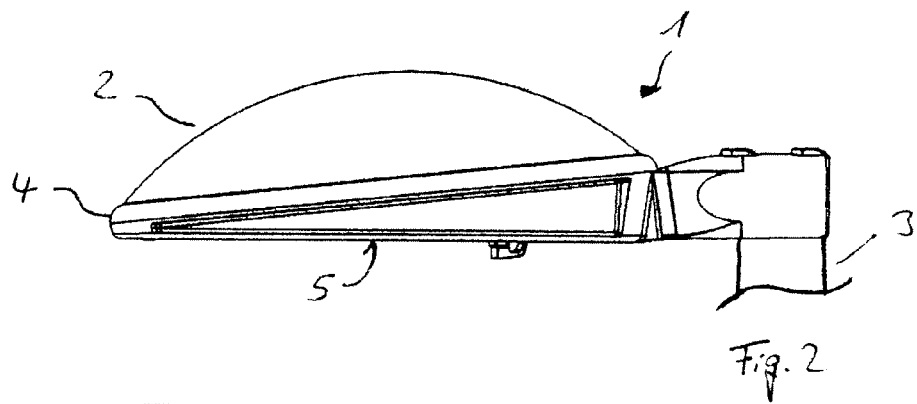
FIG. 2 shows the upper portion of an embodiment of a street lighting luminaire in accordance with the present invention.
Figure 3:
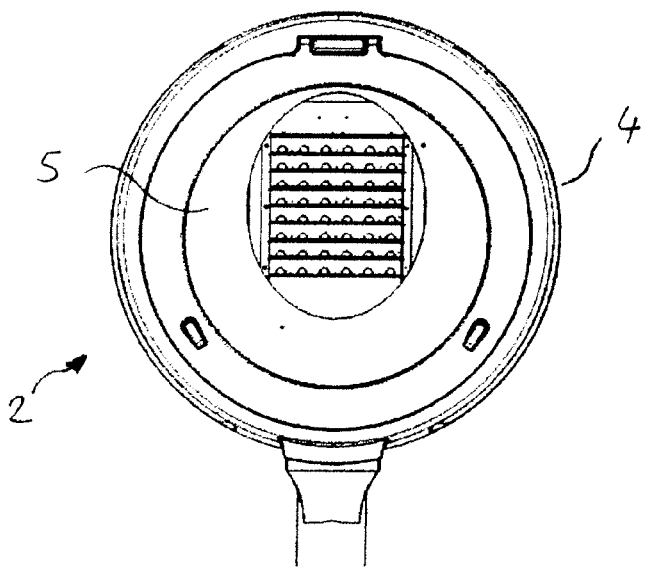
FIG. 3 shows the bottom view of the lighting head of the luminaire of FIG. 2.

At first, FIGS. 2 and 3 show an embodiment of a street lighting luminaire in accordance with the present invention which luminaire is generally designated by 1. The luminaire 1 shown in the figures comprises a lighting head 2 which is arranged on the upper end of a partially shown post 3. In the embodiment shown in the figures, the lighting head 2 has a circular housing 4 which accommodates an inventive lighting unit which is explained in detail afterwards. The bottom opening of the casing 4 is covered by a transparent cover, for example by a glass plate 5 or plate of another transparent material. Also other shapes for the lighting head 2 could be used and the present invention is not restricted to the shown shape. Further, it would be possible to directly mount the lighting head 2 to a wall.

Figure 4:
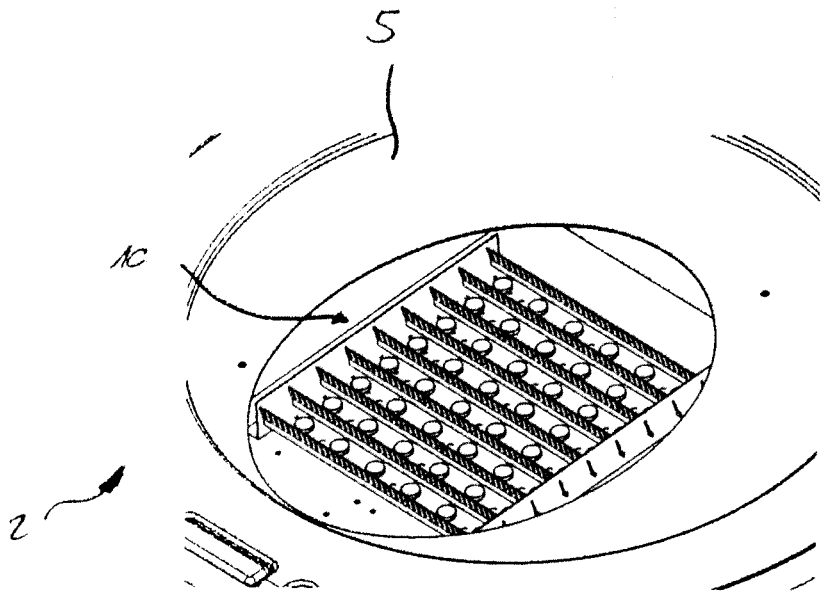
FIG. 4 shows an enlarged view of the lighting head with an inventive lighting unit accommodated therein.
Figure 5:
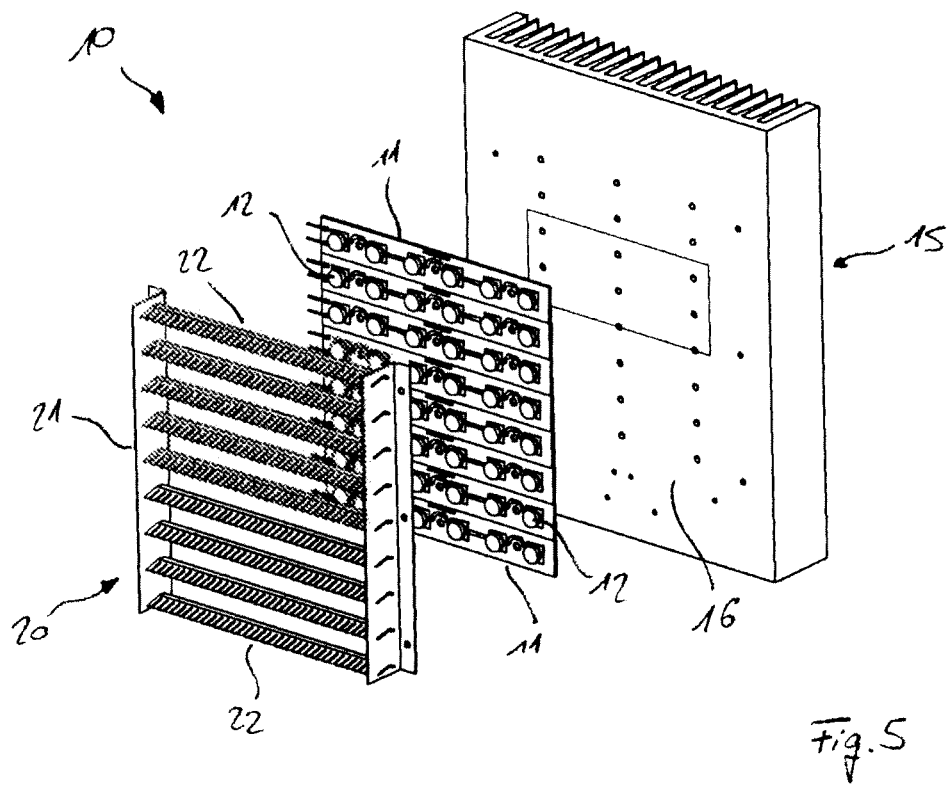
FIG. 5 shows a first embodiment of an inventive lighting unit with the different elements of the lighting unit being separated from each other.
Figure 6:
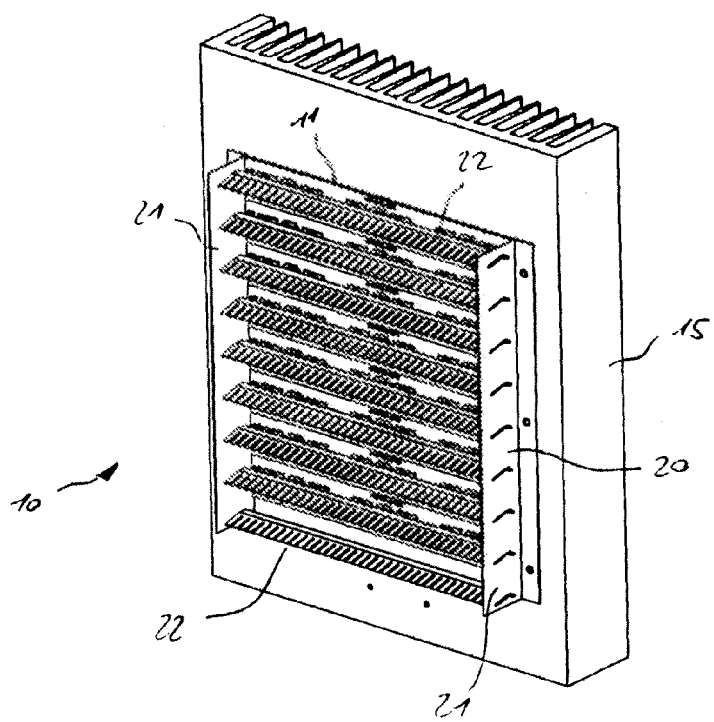
FIG. 6 shows the assembled lighting unit.

As can be gathered more clearly from the enlarged view of FIG. 4, an inventive lighting unit 10 is accommodated within the housing 4 of the lighting head 2. Of course, depending on the size and shape of the lighting head 2, also a plurality of lighting units 10 could be arranged within one lighting head 2. The structure of a lighting unit 10 is shown in more detail in FIGS. 5 and 6 wherein FIG. 5 shows the lighting unit 10 with the elements thereof separated from each other and wherein FIG. 6 shows the finally assembled lighting unit 10.

A first specific feature of the inventive lighting unit 10 is that—compared to conventional street lighting luminaires—no longer a single light source is used. Instead, the light source of the new lighting unit 10 comprises several individual light sources in the form of LEDs. In the present case, a total number of 8 printed circuit boards (PCBs) 11 is used which each carry six LEDs 12 and are mounted parallel to each other on the front surface 16 a cooling element 15 which supports the dissipation of heat. Further, the cooling element 15 also accommodates the electrical and thermal contacts of the LEDs 12. Of course, the number of circuit boards 11 and the number of the LEDs 12 arranged thereon can be adapted in order to obtain a lighting unit of a desired size. Preferably, white light should be emitted from the lighting unit 10 which is obtained by the excitation of a phosphor by a blue light given by the junction of a photo emissive diode. In this way, the resulting LED matrix provides a flat two-dimensional light source.

The light emitted by the LEDs 12 must now be influenced in such a way that the desired light distribution schematically shown in FIG. 1 is obtained. In order to obtain this light distribution, a specific reflector unit 20 is used which is arranged in front of the LEDs 12 as can be gathered from FIG. 6. This reflector unit 20 is an essential component of the inventive lighting unit 10 since it allows directing the light emitted by the LEDs 12 in the desired way. Furthermore, the light distribution in lateral direction can be easily adapted in order to correspond to a new lighting scheme. The reflector unit 20 comprises several elongated reflector elements 22 which are arranged parallel to each other and hold together by two side parts 21. These side parts are preferably again reflective in order to improve the efficiency of the lighting unit 10, i.e., no light is lost. Alternatively, the side parts 21 could also be tilted or painted in black to respectively reflect or absorb light which is emitted at more than 70° in order to better control glare.

Figure 7:
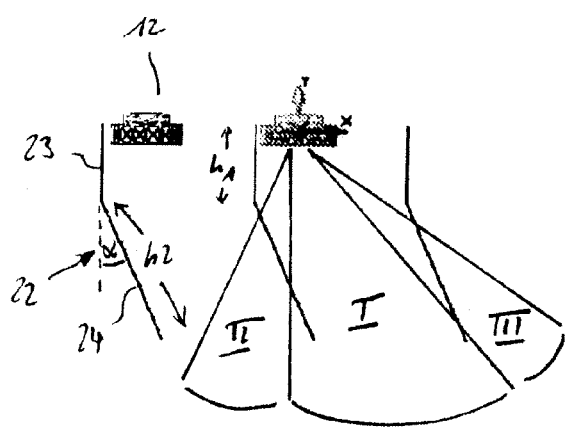
FIG. 7 shows a sectional view of the inventive lighting unit.
Figure 8:
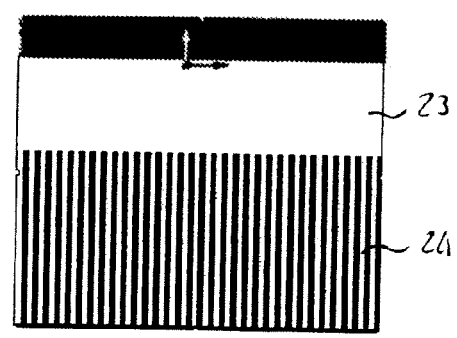
FIG. 8 shows a detailed view of the reflector elements used in the lighting unit.

A characterizing feature of the reflector elements 22 of the reflector unit 20 is that—at least some of them, preferably nearly all of them—are divided in two portions having different reflectance characteristics. In particular and as shown in FIGS. 7 and 8, a reflector element 22 comprises a first portion 23 being adapted for total reflection and a second portion 24 being adapted for partial reflection. The two portions 23 and 24 in combination form a strip-like reflector element 22 which is slightly kinked by an acute angle α as shown in FIG. 7 wherein the angle α is in the range between 0° and 45°.

FIG. 7 further shows that the light emitted by a LED 12 which is arranged between two adjacent reflector elements 20 is influenced in a very specific way due to the different portions of the two reflector elements 22. In particular, the first portions 23 which totally reflect the light define the total area in which the light emitted by the LED 12 is directed. However, due to the partial reflective portions 24, the total area is divided in three dihedrals with a main dihedral I and two side dihedrals II and III with a lower intensity of light compared to the intensity of the main dihedral I.

Although FIG. 7 only roughly shows the function of the reflector elements 22, ray tracing and experimental results have shown that the reflector unit 20 is indeed capable of providing the desired asymmetric light distribution in lateral direction. Thus, in case the height h1 of the first portion 23, the height h2 of the second portion 24, the degree of reflectance of the second portion 24 and the kink angle α are selected in an appropriate way, a light distribution can be obtained which perfectly meets the requirement of a specific road lighting scheme wherein the main portion of the light illuminates the road and wherein the two additional light dihedrals illuminate the sideways. It this situation, the reflector elements 22 are arranged parallel to the axis of the road. It has to be mention that not only the geometrical size of the light dihedrals can be selected but also their intensity. Thus, also the amount of light which is used to illuminate the sideways can be controlled. Obviously, the four parameters mentioned above (height of the totally reflective part, height of the partially reflective part, reflectance of the second portion and kink angle) can be easily influenced and therefore the light distribution of the inventive lighting unit 10 can be adapted in a fast, elegant and efficient way. Further, a change in the light distribution can also be obtained by changing the spacing between two consecutive rows of reflector elements or by changing their positions with respect to the LED sources.

Since the size of the lighting head 2 of the street lighting luminaire 1 is small compared to the width of the street to be illuminated, it is in most cases sufficient that the light of each LED 12 is influenced in the same way. Thus, all reflector elements 22 can be designed identically and the rows of LEDs 12 and reflector elements 22 are alternately arranged such that one row of LEDs 12 is always positioned between two adjacent reflector elements 22. In the present case, where eight PCBs are used, the reflector unit comprises thus nine reflector elements.

In a further development of this basic configuration, the reflector elements 22 are individually adapted depending on their position within the lighting head 2. In such a case, the light distribution can be further improved since the light of all LEDs 12 can be influenced in such a way that it better combines to the desired overall light distribution. Further, it would be possible to use reflector elements at the end portions of the lighting unit 10 which are completely totally reflective and do not comprise a partial reflective portion in order to intercept the unuseful light.

Finally, an even more precise light direction could be obtained in case two reflector elements 22 are used to individually direct the light of a single row of LEDs 12. In such a case, groups comprising two reflector elements 22 with a row of LEDs 12 placed between the reflector elements 22 are formed and only each second row between the reflector elements 22 is thus covered by LEDs 12. In this case, the reflector elements 22 again are individually adapted depending on their position within the lighting head 2.

A specific advantage of the present invention is also that the total planar light emitting surface of the luminaire can be increased by combining several lighting units 10 as shown in FIG. 4. Although all units could be identical, it would also be possible to combine lighting units with different characteristics, i.e., different light distributions and/or different colors to further improve the quality of the light.

Figure 9:
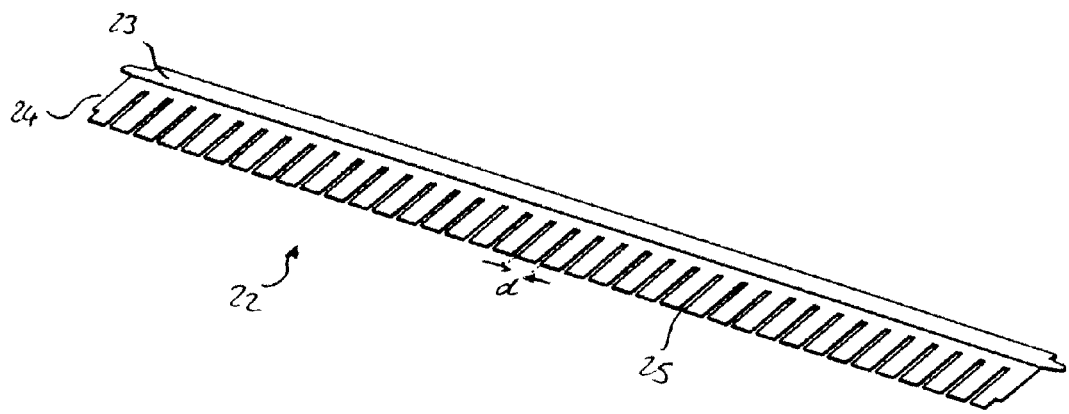
FIGS. 9 to 11 show different embodiments of reflector elements which can be used in the inventive lighting unit.
Figure 10:
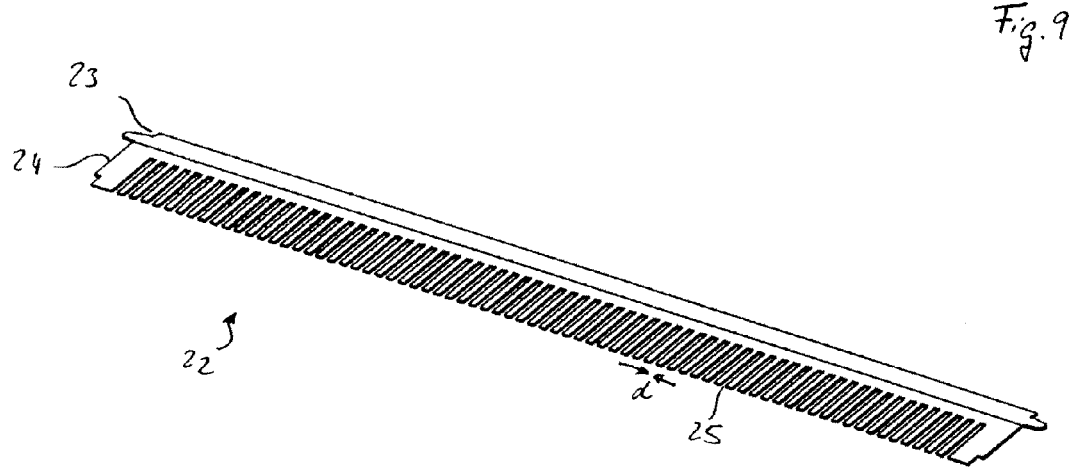
Figure 11:
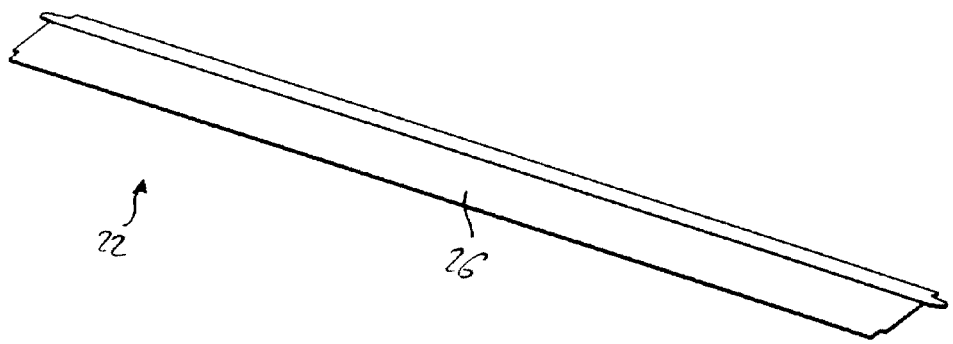

FIGS. 9 to 11 finally show three different embodiments of a reflector element 22 which can be used in the inventive reflector unit 10.

In the embodiments shown in FIGS. 9 and 10, the second portion 24 which is only partially reflective is obtained by cutting slots or other cutouts 25 or openings in the reflector element 22, for example by laser cutting and/or stamping in order to obtain a comb like reflector. By selecting a specific size and/or distance d between the slots 25, the degree of reflection of this portion 24 can be increased or lowered. Further, such reflector elements 22 can be easily produced from metal strips.

In an alternative embodiment which is shown in FIG. 11, it would also be possible to obtain the partial reflective portion 24 by using a transparent core material for the reflector element which is covered by a total and partial reflective coating. In this case, a reflector element with an enclosed surface 26 is obtained which again has two portions of different reflectively.

The specific structure of the reflector unit therefore allows directing the light emitted by the LEDs in a desired way in lateral direction. Furthermore, a very compact lighting unit is obtained which can be easily accommodated in lighting heads with small housings.

The invention claimed is:

1. Lighting unit for use in a luminaire, said lighting unit having a plurality of LED light sources and a reflector unit arranged in front of said LED light sources to control the distribution of the light emitted by said LED light sources, wherein said reflector unit comprises a plurality of reflector elements arranged parallel to each other, wherein at least some of said reflector elements comprise a first portion adapted for total reflection and a second portion adapted for partial reflection,
- wherein the LED light sources and reflector elements are arranged on a common mounting surface that is planar or roughly planar,
- wherein the LED light sources are arranged in parallel rows, a row of LED light sources being located between two adjacent reflector elements, and
- wherein the reflector elements extend from said common mounting surface.

2. Lighting unit according to claim 1, wherein the first portions of said reflector elements are—seen in a light emitting direction—located nearer to the light sources compared to the second portions of said reflector elements.

3. Lighting unit according to claim 1, wherein the reflector elements are arranged on said common mounting surface together with the light sources.

4. Lighting unit according to claim 3, wherein the common mounting surface is provided by a surface of a cooling element.

5. Lighting unit according to claim 1, wherein the light sources are arranged in parallel rows, a row of light sources being located between two adjacent reflector elements.

6. Light unit according to claim 5, wherein the rows of light sources and the reflector elements are arranged in an alternating manner.

7. Lighting unit according to claim 5, wherein groups comprising two reflector elements with a row of light sources placed between the reflector elements are formed.

8. Lighting unit according to claim 1, wherein at least for some of the reflector elements the second portion is inclined with respect to the first portion.

9. Lighting unit according to claim 1, wherein the second portions of said reflector elements comprise a partial reflective coating.

10. Lighting unit according to claim 1, wherein the second portions of said reflector elements comprise cutouts.

11. Luminaire for road and/or street lighting, said luminaire having a lighting head with a housing in which at least one lighting unit according to claim 1 is accommodated.

12. Luminaire according to claim 11, wherein the lighting head extends with respect to a horizontal surface by an acute angle between 0 degrees and 15 degrees.

13. Luminare according to claim 11, wherein several lighting units are accommodated in the lighting head which lighting units are identical.

14. Luminare according to claim 11, wherein several lighting units are accommodated in the lighting head which lighting units differ from each other with respect to the light distribution and/or light color.

15. Lighting unit according to claim 10, wherein the cutouts are slots or openings.

* * * * *